3,426,950
MOTION PICTURE PROJECTOR WITH AUTOMATIC FILM THREADING AND LOOP FORMING MECHANISM

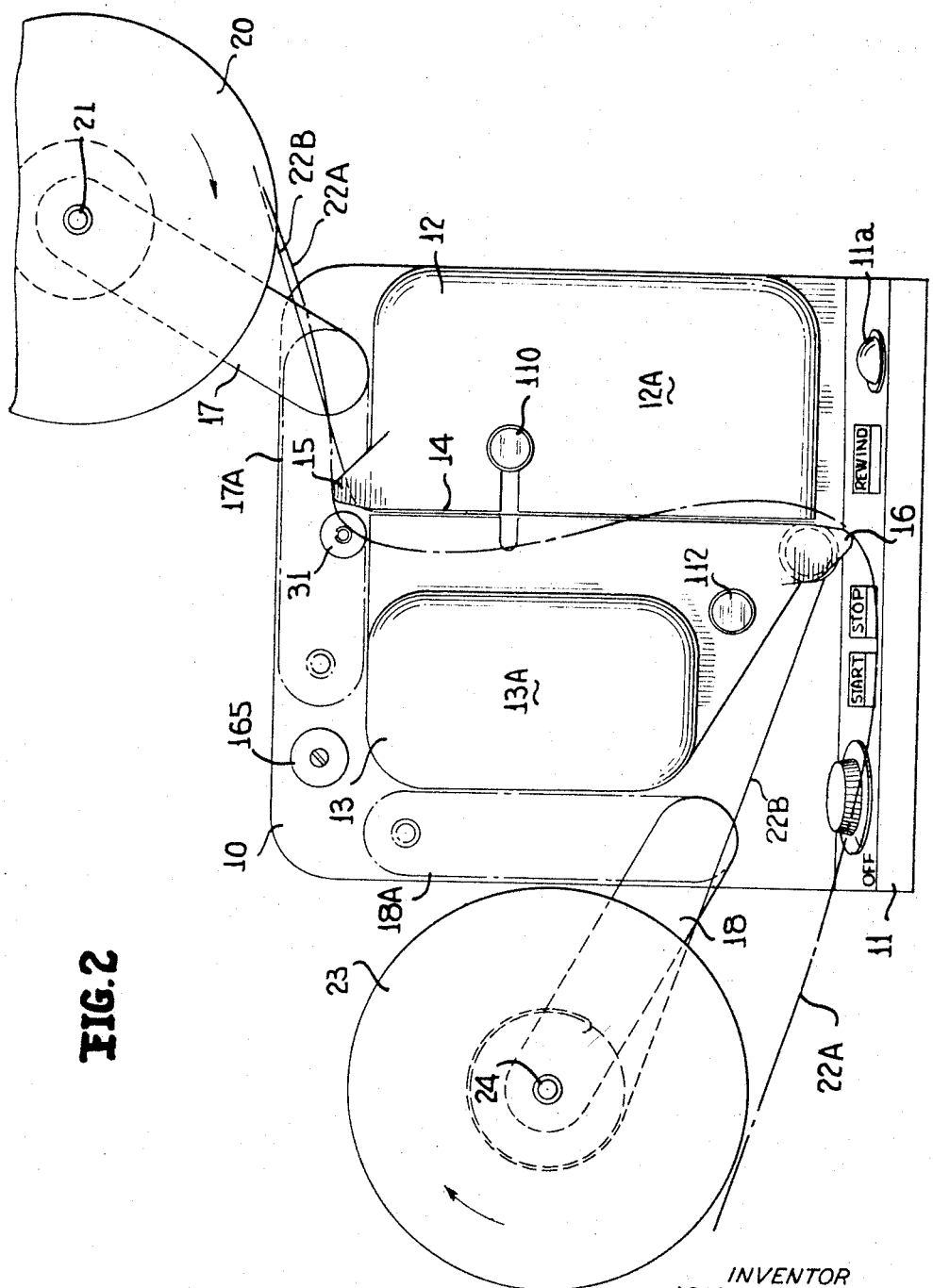

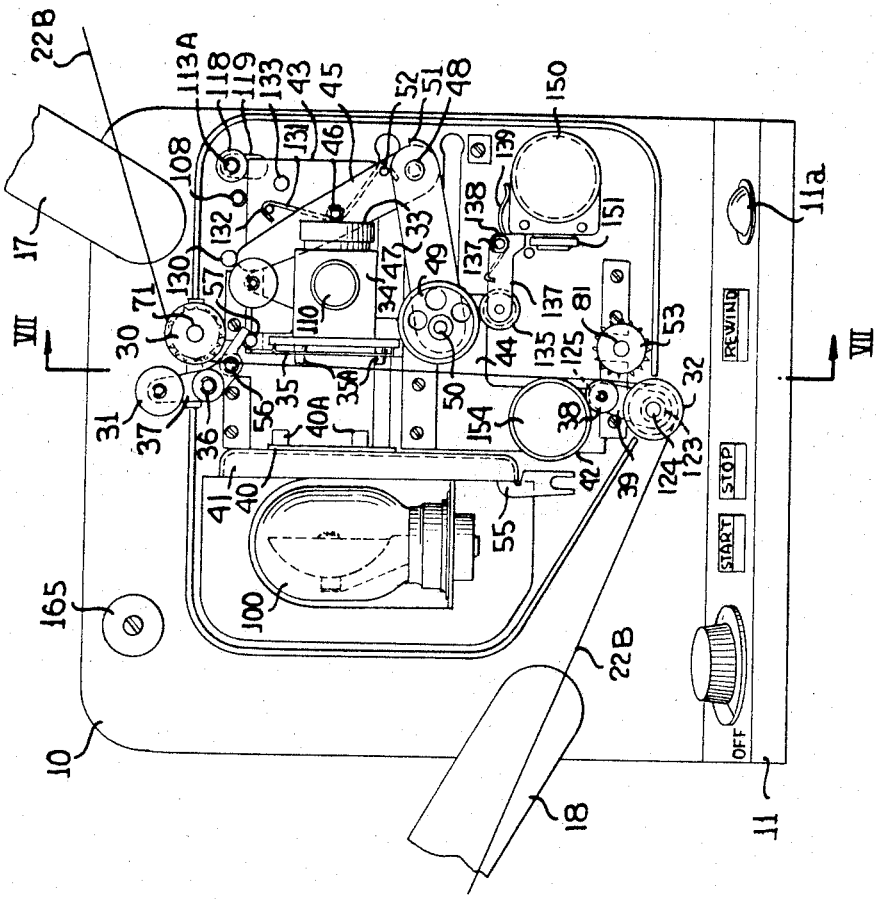
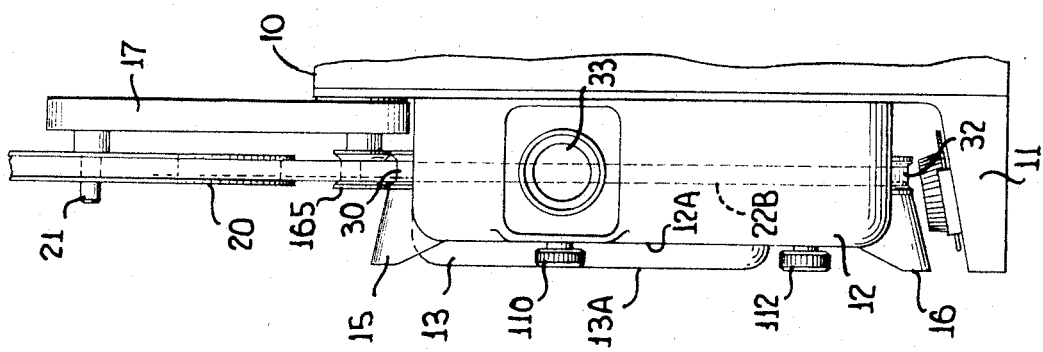

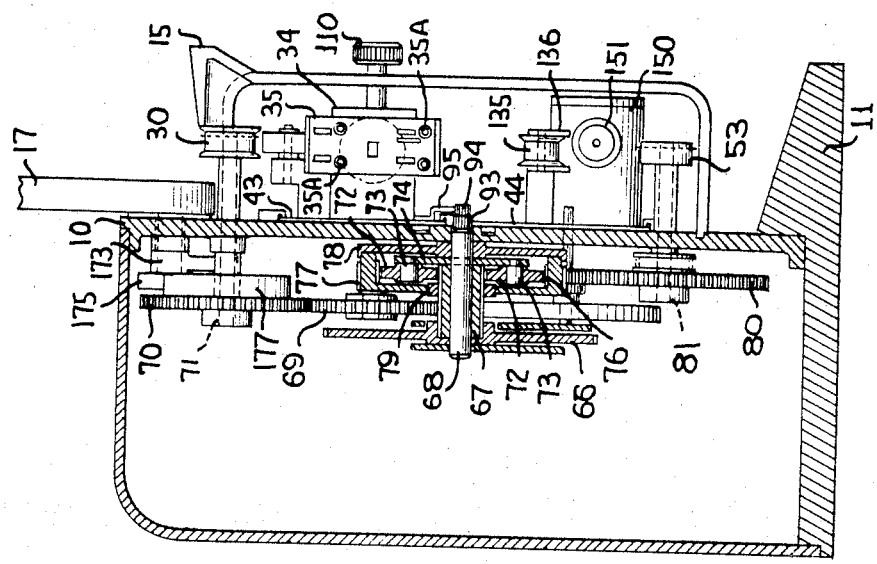

John A. Maurer, Jr., Somerset, N.J., assignor to J.M.D. Industries, Inc., New York, N.Y., a corporation of New York
Original application July 27, 1962, Ser. No. 212,858, now Patent No. 3,259,291, dated July 5, 1966. Divided and this application July 1, 1966, Ser. No. 562,323
U.S. Cl. 226—91    21 Claims
Int. Cl. B65h 17/42; G03b 1/58

This application constitutes a divisional application of application Ser. No. 212,858 filed July 27, 1962, and now Patent No. 3,259,291.

This invention relates to motion picture projectors, and, in particular, to portable motion picture projectors made to use the smaller sizes of film, such as 16 mm. and 8 mm. film.

In order to operate the great majority of the projectors that have been made in the past, it is necessary to "thread" the film manually, that is, pass it around various toothed sprockets, through the picture gate and, in the case of sound projectors, around various rollers in the sound reproducing mechanism, placing the perforations in the film in mesh with the teeth of the sprockets before closing guide members which afterward hold the film in contact with the sprocket, and establishing loops of the correct lengths between the sprockets and the other parts of the mechanism through which the film passes.

In practice, many people find the threading of the film a complicated and difficult operation. If the film is threaded incorrectly, it is likely to be damaged and, even if this does not occur, the performance is likely to be unsatisfactory; for example, the sound may be reproduced out of synchronism with the action in the picture. Because of this difficulty and because of the fear of damaging film, many people, as, for example, school teachers, who would otherwise have good reasons for using motion picture films and projectors, tend to avoid doing so.

In order to overcome the difficulty of the manual threading of film, "self-threading" projectors have been built in which the end of the film leader is introduced endwise into a slot or a chute which leads into the first toothed sprocket, against which it is pressed by a resiliently mounted guide so that the teeth of the sprocket are able to find their way into the perforaions of the film and drive it forward when the mechanism is put in motion. As the film is advanced, the leading end is guided by a series of curved members which force it to travel in succession to the other parts of the mechanism in such a way that it is engaged successively by the various driving members and sprockets, and loops of the current lengths are formed where required between the various parts of the mechanism. When the leading end of the film has been carried through the complete threading path, it emerges from the mechanism and at this point it is necessary to attach it to the take-up reel. This may be accomplished by causing such end of the film to emerge in a position where it will drop into contact with the hub of a reel that is provided with small hooks to engage the perforations. This, however, is not completely reliable and, furthermore, the user may place on the take-up spindle a reel that does not have the necessary small hooks; therefore, it is usually necessary to stop the mechanism in order to attach such ends of the film to the reel. When the mechanism is again put in motion to project the film, it is also necessary in some way to withdraw the curved threading guides from contact with the film so that the film in the loops can move freely. This may be accomplished automatically or by a separate manual control.

The type of "self-threading" projector just described has several disadvantages. First of all, successful engagement of the perforations in the film with each of the sprockets depends on the condition of the end of the film strip; this must not have a sharp bend anywhere near the leading end region (such as is often produced by attaching the film to a reel); the perforations at the end of the strip must not be torn, and the spaces between them must not be indented. In order to obtain a film end that is in proper condition to operate with the self-threading mechanism, it is often necessary to cut off a few frames of the film with scissors before presenting the end of the film to the machine. Even if this is done, the end of the film is usually damaged to a slight extent each time it enters the mechanism so that after the film has been used a few times, it is again necessary to cut off the film to obtain a clean end.

If the film end is not in good condition, it is likely to be damaged further by the first sprocket in the projector to such an extent that it will become jammed at some later point in its path. If this occurs, a pile-up of film results, and a considerable length of film may be damaged.

While this sequential or endwise feeding type of self-threading mechanism has been applied with some success to projectors of silent motion pictures, it is much more difficult to make it operate successfully in sound-projectors because a more complicated film path is required to achieve the extremely steady film motion at the sound reproducing point that is necessary for good sound reproduction.

The major object of the present invention is to provide projectors for silent and for sound motion pictures which are so simple to operate that they may be used successfully and without damage to film by persons who are not mechanically minded or skilled and who are without previous experience in the handling of motion picture film, and also by children of early school age.

Another object of the invention is to provide a mechanism which, by a set of uniformly progressing motions, will engage a straight or nearly straight strand of film and operate on it to form loops of correct lengths where they are needed and, at the same time, bring the perforations of the film into proper engagement with the toothed sprockets and other cooperating parts of the projector so that the film is left in operating position, ready to function correctly in the projection of pictures and, in the case of sound projectors, in the synchronous reproduction of sound.

Still another object of this invention is to provide a mechanism by which the formation of the film loops and engagement of the film with the cooperating parts of the projector is accomplished by the power provided by the drive motor of the projector when this motor is first started.

Another object of the invention is to provide a mechanism by which the film loops are formed and the necessary engagements of the film with the cooperating parts of the projector are accomplished substantially simultaneously instead of sequentially, as has been customary in the prior art.

Another object is to provide a mechanism by which, when the loop-forming and film-engaging functions have been performed, the power of the drive motor is disconnected from the film-threading mechanism and simultaneously applied to drive the projector in the normal manner so that there is no appreciable pause between the completion of the threading operation and the beginning of the projection of pictures and the reproduction of sound.

Another object is to provide a mechanism by which, when the projector is stopped at the end of the showing of a film, the film-threading mechanism is automatically restored to a condition of readiness to receive a new film.

In the use of any projector that operates with film having a row of perforations along only one edge, such as 16 mm. sound film or 8 mm. film, if an attempt is made to thread film that has not been rewound after projection or which has been turned incorrectly in rewinding, the perforations will come to the mechanism along the wrong edge of the film and, if the film is actually brought into engagement with the mechanism, as may be done in the case of the end-wise inserting, sequential threading type of self-threading mechanism, the film will be damaged. It is an important object of this invention to provide a mechanism which is capable of sensing that film has been presented to it incorrectly and responding to this condition by stopping the drive motor within a fraction of a second after it has been started, so that the incorrectly presented film is not damaged.

A related object of the invention is to give a warning signal to inform the operator of the projector that he has inserted a film that is turned so that the perforations are along the wrong edge.

It is also possible for unusually careless persons to insert the film only partially as, for example, by not attaching the end of the leader to the take-up reel or by not winding up the slack film after attaching the end, so that the film has not been drawn fully into the slot which it should enter. One of the objects of this invention is to provide means by which the mechanism will sense this condition if it occurs and respond by stopping the drive motor within a fraction of a second after it has been started, so that the film will not be damaged.

These and other objects which will become apparent in the course of this description are accomplished by the mechanism shown in the accompanying figures of the drawings in which may be seen:

(1) An upright supporting plate attached at right angles to a base, and carrying:

A. A gear train, including a differential mechanism of the planetary gear type or other form of selective coupling mechanism by which power can be transmitted from an initial driving gear to either of two driven shafts, B. A feed-in sprocket and rollers for holding the film in contact with said feed-in sprockets, C. An aperture and film guide in the support plate upon which are mounted a film pull-down mechanism, for intermittent movement, of the claw-type, and a rotating sector shutter, D. A lamp for illuminating the picture, E. A slide-plate carrying a film-flattening pressure plate and a projection lens, F. A second slide-plate carrying a sound-reproducing drum, G. A flywheel and drive shaft for stabilizing the motion of the sound-reproducing drum, H. A guide roller to hold the film in contact with the sound-reproducing drum and at the same time, to control the lateral position of the film as it passes around the drum, I. A lamphouse and optical system for the sound-scanning light beam, J. A hold-back sprocket and rollers to hold the film in contact with the hold-back sprocket and to guide the film away from it, K. Hinged arms which may be extended to support film reels, L. A slotted enclosure for the film handling, picture projecting and sound-reproducing parts of the mechanism, which enclosure may be made up of two cover members, each of which carries a projecting film guide member and which are attached to the upright supporting plate in such a way that they form between their adjacent edges a continuous slot without sharp bends, for example, a substantially straight slot, M. A drive motor coupled to the gear train by a belt, N. A set of three push-buttons for activating starting, stopping and rewinding operations of the projector.

The feed-in sprocket, which is preferably located next to the top of the film loading slot, is driven by a train of gears that does not include the differential mechanism. The intermittent film pull-down movement is driven directly by the belt from the motor. The hold-back sprocket, which is at the bottom of the film loading slot is, however, driven from the outside or ring gear of the differential mechanism. This is one of the two power outputs of the differential. The other power output is a shaft connected to a disc which supports the planetary gear or gears. The power input to the differential is on the so-called "sun" gear.

The differential mechanism has mounted next to it on the upright support plate a lever carrying a brake-shoe which is adapted to be pressed against a drum attached to the ring-gear of the differential so that this ring-gear is prevented from rotating. When this condition exists, all the power that is supplied by the motor to the differential is applied to turning the disc and shaft which support the planetary gears. This shaft, in turn, is connected by gears to the two slide-plates referred to above which, by the movement thus imparted to them, accomplish the completion of the threading of the film.

The brake-shoe lever is connected by a second lever and a bow-spring to a third lever which is in a position to be moved by a pin on one of the two slide-plates; the combination constitutes a snap-action mechanism which has two positions of stability. In one of these positions, the brake-shoe is held firmly against the brake-drum on the differential; in the other position, the brake-shoe is held away from the drum. A pin and the lever with which it cooperates control this action in such a way that the snap-action which releases the brake-drum occurs substantially at the instant when the two slide-plates reach their final positions, at which time the film loops have been formed and all is in readiness for normal operation of the projector.

The sequence of events in placing the projector in operation is as follows:

A reel of film is placed on the feed-spindle which is, in turn, supported by an upper arm of the machine. An empty reel is placed on the take-up spindle of a lower arm. A length of approximately two feet of film is unwound and threaded edgewise through the slot, and the leading end of the film is then attached to the take-up reel which is rotated until whatever slack film was present has been wound upon the hub of the take-up reel.

The "start" button is pressed down to close a circuit which supplies electric power to the projector driving motor in such a way as to cause it to rotate in the forward direction. The brake-shoe is, at this point, firmly pressed against the brake-drum and, therefore, the ring-gear of the differential is prevented from rotating. Since the gear which drives the hold-back sprocket is in mesh with this ring-gear, the hold-back sprocket does not turn and no film is being fed out of the mechanism. At the same time, the feed-sprocket is rotating and feeding in film. The power applied to the sun-gear of the differential mechanism appears on the shaft that is connected to the planetary gear support disc and, since this is geared to the two slide-plates, they move in opposite directions displacing the strand of film into an S-shaped pattern and thereby taking up the excess film that is being fed in by the rotating feed-sprocket. Actuating pins mounted on these two slide-plates operate at the beginning of the motion to move retaining rollers into contact with the film on the two sprockets so that at each sprocket the film is held in mesh with the teeth.

As the two slide-plates continue to move, the one carrying the projection lens and the film-flattening pressure plate in the direction to close the film-gate, the other carrying the sound reproducing drum in the direction of the sound scanning optical system, a very light-weight idler roller carried by a combination of two levers pivoted on the upper slide-plate moves to the left and downward in such a way as to pull down a certain amount of film past the picture aperture and thereby creates a loop of the length that is required to give synchronized reproduction of sound and picture.

The last fraction of an inch of movement of the two sliding-plates brings the film into engagement with the pull-down claw and also brings that part of the film which is around the sound-reproducing drum into the focus of the sound-scanning optical system. At the same instant, the snap-action mechanism removes the brake-shoe from the brake-drum so that the outer ring-gear of the differential mechanism and, with it, the hold-back sprocket, begin to rotate. The shaft attached to the disc which supports the planetary gears can now turn no farther, since the lower slide-plate comes against a firm stop, and, therefore, all the power of the drive motor is applied to turning the parts of the projector in a normal operating mode.

The mechanism by which the machine is able to sense the fact that film has been presented to it incorrectly and by which the motor is stopped before serious damage can be done to the film will be described later in connection with the detailed description of the entire mechanism, since this detailed knowledge is needed in order to understand how these parts operate.

What has been stated above will be better understood from a detailed description which follows, taken in connection with the drawings in which:

FIGURE 2 is an elevational external side view of the projector of FIGURE 1, somewhat simplified, looking from the film-threading side of the projector.

FIGURE 3 is a front elevational view of the projector of FIGURES 1 and 2.

FIGURE 4 is the same view thereof as in FIGURE 2 with the covers removed to show the projector parts visible from such view in their positions after a strand of film has been inserted in the film slot and initially tensioned by manual rotation of the take-up reel after the leading end of the film has been connected to the take-up reel.

FIGURE 6 is an elevational rear view of the projector of FIGURE 1 with the back housing cover removed showing the gear train.

FIGURE 7 is a cross-section view taken generally along line VII—VII of FIGURE 4.

Figure 1:
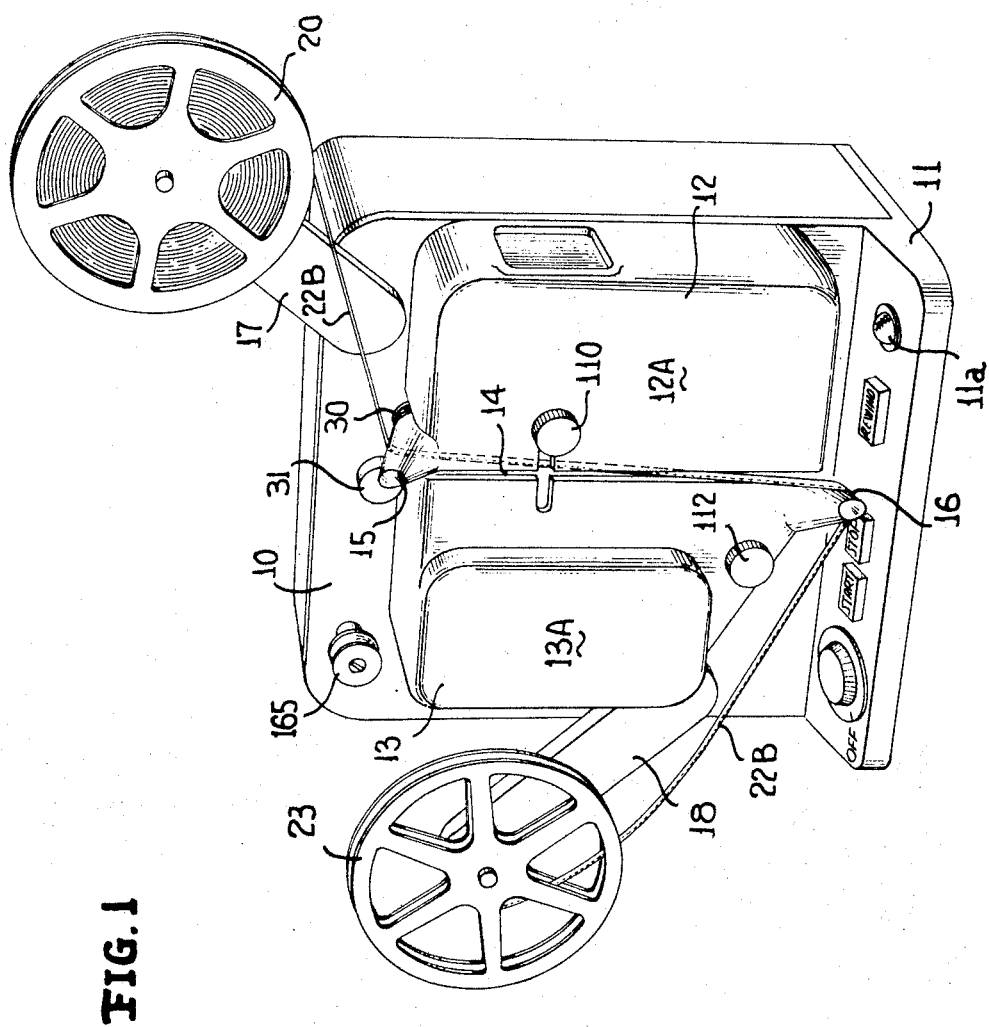
FIGURE 1 is a perspective view of an illustrative embodiment of the portable motion picture projector in accordance with this invention.

Referring to FIGURES 1 and 2, an upright support-plate, on which the mechanism is mounted, is generally designated by the reference 10 to which is attached at right angles a base 11. Two cover members 12, 13 have adjacent edges defining a film-receiving slot 14. The cover 12 carries on its upper part a projecting film guide member 15, and the cover 13 carries on its lower part a projecting film guide member 16. As best shown in FIGURE 3, a portion 13A of the front wall of the cover 13 is preferably further from the support plate 10 than a front wall 12A of the cover 12. An upper film-reel support arm 17 and a lower film-reel supporting arm 18 are pivotally attached to the support plate 10. When the projector is to be placed in its case for storage, they are turned from the operating positions in which they are shown by solid lines in FIGURE 2 into the positions shown in phantom lines 17-A and 18-A.

A reel 20 carrying film to be projected is placed on the spindle 21 (FIGURE 2) of the reel-support arm 17, and the end 22A of the film is pulled off to a length of approximately two feet. This film end, or leader, is placed loosely around the two film guide-members 15 and 16 along a first path such as is shown by the heavy dotted lines in FIGURE 2 of the drawings. The end of the film leader is then attached to the hub of an empty film reel 23 which is placed on a spindle 24 of the reel-support arm 18. The reel 23 is next rotated in the direction of the unnumbered headed arrow in FIGURE 2 until the slack in the film has been wound up. When this has been done, the film will have slipped toward the support plate 10 on inclined surfaces of the guides 15 and 16 and will be in the position shown by the heavy solid line 22B of FIGURE 2. When the film is threaded in this manner, a portion thereof comes to rest in channels (unnumbered) of a sprocket 30 and a roller 32 (FIGURE 4).

Referring now to FIGURE 4 of the drawings, the portion of the film between the sprocket 30 and the roller 32 is disposed in a space free of obstructions to the left of a projection lens 33, its mount 34 and a pressure-plate 35 with its guide pins 35A which will later hold the film against the aperture plate 40 between its guide projections 40A; the aperture plate being mounted on the casing 41 in which the intermittent movement and the sector shutter are located. The film also has a space free of obstruction to the right of a round-reproducing drum 42 and the idler roll 38 which will later move on its leader arm support 39 to hold the film against the hold-back sprocket 53. The situation shown in FIGURE 4 is the one that exists after the film has been pulled into the slot 14 by the taking up of slack on the take-up reel 23 but before the motor has been started by pushing down the button (unnumbered) marked "Start."

FIGURE 4 also shows the upper slide-plate 43 which carries the projection lens mount 34, and the lower slide-plate 44 which carries the sound-reproducing drum 42. A lever 45 is pivoted to slide-plate 43 on a stud 46, and a second lever 47 is pivoted to lever 45 on a stud 48. Lever 47 carries at its other end an eccentric roller 49 which can rotate on a stud 50. A projection 51 on lever 47 and a pin 52 on lever 45 limit the motion of lever 47 on its pivot 48.

Figure 5:
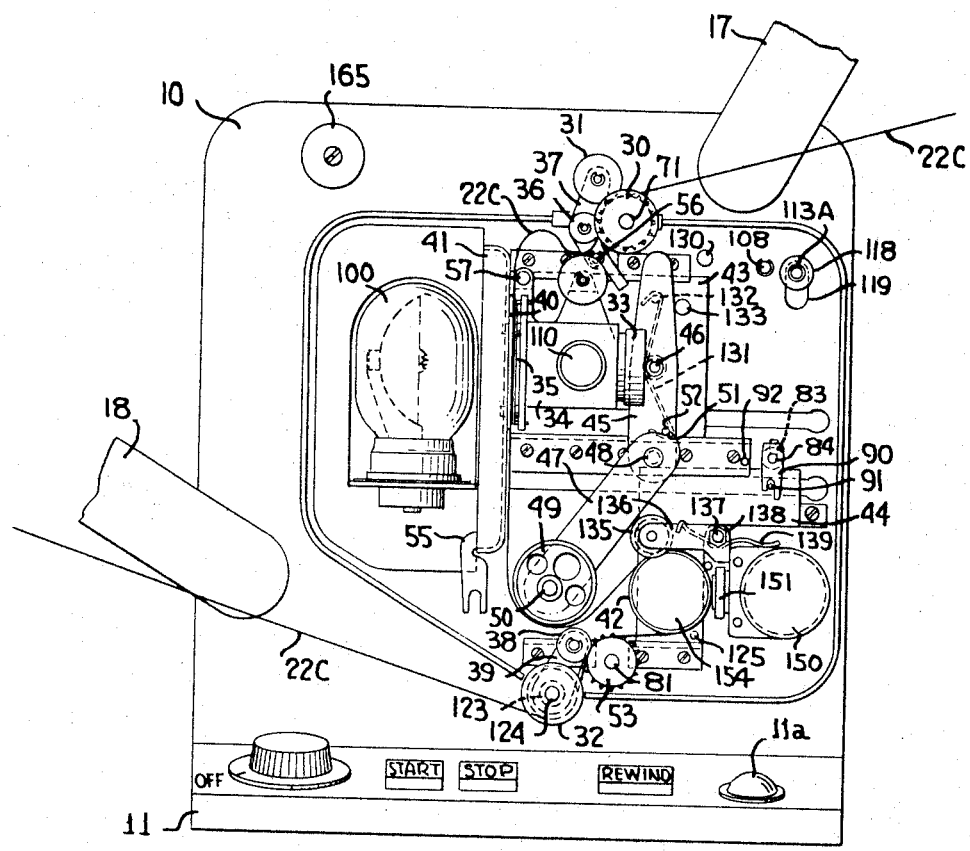
FIGURE 5 is the same view thereof as in FIGURE 4 with the parts shown in the positions occupied after the automatic threading has been completed and the film advancing mechanism is ready to advance the threaded film in the normal way.

When the "Start" button is depressed and the motor begins to run, the slide 43 moves to the left from the position illustrated in FIGURE 4 to the position illustrated in FIGURE 5, the slide 44 moves to the right as viewed in these two same figures, and the levers 45 and 47 move the roller 49 to the left and downward. At the same time, the sprocket 53 remains motionless while the film is pressed against it by the idler roller 38 on the initial movement of the lower slide 44 to the right. The idler rollers 31 and 36 are moved against sprocket 30 by a movement of their supporting lever 37 on initiation of such movement of slide 43 to the left, and sprocket 30 driven, as hereinafter shown, by the projector driving motor, turns counterclockwise feeding film into the system. By these actions, the straight length of film between the sprocket 30 and the idler roller 32 is progressively modified first to an S-shaped pattern and then into the pattern shown in FIGURE 5 which shows the same part as FIGURE 4 in the positions they have reached at the end of the threading action. The film path is now designated by the reference character 22C in FIGURE 5 of the drawings.

In order to understand how the parts shown in FIGURES 4 and 5 are made to move as has been indicated, reference is now made to FIGURES 6 and 7 which show the gear train of the projector and related parts. In FIGURE 6, the drive motor 60, which is mounted on the base 11, is coupled by a belt 61 on pulleys 62 and 63 to a shaft 64 on which is fastened a gear 65. Gear 65 meshes with a larger gear 66, the speed ratio being 4 to 1. Gear 66 is mounted on a pinion 67 which has a hole through its center and is mounted to rotate on a shaft 68. A bridging gear 69 mounted on a stud 75 is in mesh with the pinion 67, and is also in mesh with the gear 70. The speed ratio between the pinion 67 and the gear 70 is 4 to 1, so that the overall speed ratio from the gear 65 to the gear 70 is 16 to 1. The gear 70 is mounted on a shaft 71 which extends through the support plate 10 and has the sprocket 30 fixedly mounted on its other end (FIGURE 4). The intermittent movement of the projector is driven from shaft 64 in such a way that one frame of film is advanced for each rotation of the shaft 64. Sprocket 30 has 16 teeth, therefore, since it makes one rotation for every 16 revolutions of shaft 64 and gear 65, it advances film at the correct rate to keep up with the intermittent movement.

The pinion 67 is also in mesh with two gears 72, 72 which are mounted on studs 73, 73 on a supporting disc 74 which is fastened to shaft 68. This construction is shown in section in FIGURE 7. The gears 72, 72 are in mesh with an internal gear 76 which is integral with an external gear 77. Gears 76 and 77 are part of an enclosed structure, including a cap 78 (FIGURE 7), and they rotate on two coaxial bearings, one of which is between the cap 78 and the shaft 68, while the other is on the outside of a collar 79 fastened to the pinion 67. The structure consisting of the pinion 67, the supporting disc 74, the studs 73, 73, the gears 72, 72, the gear 76 and the gear 77 constitute a planetary gear differential in which the pinion 67 is the sun-gear, gears 72, 72 are the planetary gears, and gear 76 is the internal gear with which the planetary gears are in mesh. In this case, the sun-gear 67 is the power input to the differential and the two outputs are, first, the shaft 68 to which is fastened the disc 74 which supports the planetary gears and, second, the gear 77, which is integral with the internal gear 76. If either of these outputs is held fixed while the other is free, all the power will be delivered on the free output. As will be seen, in this mechanism the output of the external gear 77 is held fixed at the beginning of the operation of the projector in order that all power will be delivered to the shaft 68 which operates the slides 43 and 44. At the instant that these slides reach their limiting positions (FIGURE 5), which means that shaft 68 is held fixed, gear 77 is released.

The gear ratio from the pinion 67 to the internal gear 76 is 4 to 1. Gear 77, which must rotate with gear 76, is in mesh with a gear 80 which has the same number of teeth as the gear 77. The overall speed ratio of the shaft 64 to the gear 80 is, therefore, 60 to 1. The gear 80 is mounted on a shaft 81 which extends through the plate 10 and has the 16-tooth sprocket 53 mounted on its other end (FIGURE 4). Again, the overall gear ratio is such that sprocket 53 rotates at the correct speed, i.e., at the speed of rotation of the sprocket 30.

The cap 78 (FIGURE 7) is cemented or otherwise securely fastened to the gears 76, 77. It has a smooth, cylindrical outer surface of the same diameter as the outer diameter of the gear 77, and this surface serves as a brake-drum. A lever 82 (FIGURE 6) which is mounted for oscillatory motion on the outside of a sleeve 83 which is pressed into a hole in the support plate 10, carries a brake-shoe 87 which is in line with the outside or brake-drum surface of the cap 78. When the end of the lever 82, which is nearest the outside of the mechanism, is pressed upward, this brake-shoe 87 is in contact with the brake-drum surface of the cap 78 and prevents it from rotating. The shaft 84 has a bearing on the inside of sleeve 83 and extends through it to the other side of plate 10. On that end of shaft 84, which is shown in FIGURE 6, another lever 85 is fastened. This lever 85 is resiliently coupled to the lever 82 by a bow-spring 86 which has its ends wrapped around pins 88 and 89 inserted in levers 82 and 85. When the lever 85 is in the position shown in FIGURE 6, the spring 86 is under compression and forces lever 82 upward and thus applies pressure to force brake-shoe 87 against the brake-drum surface of the cap 78.

With reference now to FIGURE 5 of the drawings, it will be seen that the sleeve 83 and the shaft 84 pass through the main support 10 and, on the side which carries the film handling parts, the shaft 84 carries a lever 90 having a pin-receiving open slot (unnumbered) at its free end which is in a cooperative relationship with a pin 91 mounted on slide-plate 44. These parts are hidden from view in FIGURE 4 but they may be seen in FIGURE 8 in the positions they occupy when the other parts are located as they are in FIGURE 4. These are the positions of the lever 90 and the pin 91 which correspond to the positions of levers 82 and 85 as they are shown in FIGURE 6. A pin 92, pressed into the vertical support plate 10 serves as a stop for the lever 90. This, in turn, holds lever 85 through shaft 84 so that lever 85 cannot go any lower than the positon in which it is shown in FIGURE 6. This maintains the force on bow-spring 86 to keep lever 82 pressed firmly upward.

Figure 8:
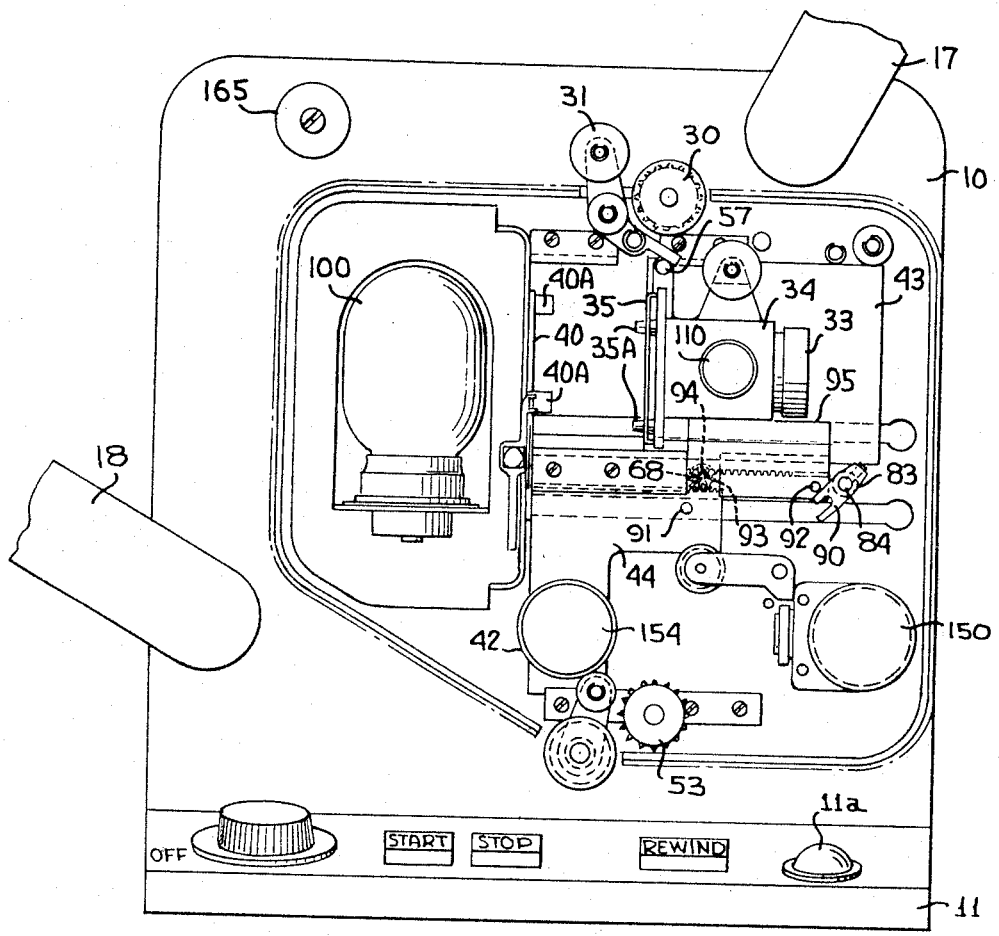
FIGURE 8 shows parts of the mechanism which are hidden from view in FIGURE 4, these parts being shown in the positions they occupy when the other parts are positioned as shown in FIGURE 4.

In FIGURES 7 and 8 it will be noted that the shaft 68 has two small gears 93 and 94 cut on the end which protrudes through the vertical support plate 10. The gear 93 is in mesh with a rack (unnumbered) cut in the upper edge of the lower slide-plate 44, while the gear 94 is in mesh with a rack (also unnumbered) cut in the lower edge of an offset strip 95 fastened to the upper slide-plate 43. In FIGURE 8 it may be seen that when the shaft 68 and the gears 93, 94 rotate counterclockwise, the slide-plate 43 will move to the left and the slide-plate 44 will move to the right.

Referring now to FIGURES 5 to 8, the action of the mechanism, starting from the time when the motor 60 is energized, is as follows:

The lever 90 is in the position shown in FIGURE 8 which means that the lever 85 and the lever 82 are in the positions shown in FIGURE 6. The brake-shoe 87 is pressed firmly against the brake-drum surface of the cap 78 which prevents the gears 76, 77 from rotating and, therefore, the gear 80 and the sprocket 53 (FIGURES 4 and 5) are held stationary. The rotation of the pinion 67 carries the planetary gears 72, 72 with their supporting plate 74 and shaft 68 in a direction that is clockwise as viewed in FIGURE 6 and counterclockwise as viewed in FIGURE 8 of the drawings. As has been stated, the plate 43 is moved to the left (as viewed in FIGURES 4, 5 and 8) while the plate 44 is moved to the right. As the plate 44 approaches its final position, the pin 91 enters the slot in lever 90 and moves it counterclockwise toward the position shown in FIGURE 5. This rotates the shaft 84 and raises lever 85, further compressing the bow-spring 86. When the lever 85 reaches the position where the pin 89 which it carries is a little above pin 88 on the lever 82, the spring 86 can release part of its energy by driving lever 82 downward. This abruptly removes the brake-shoe 87 from the brake-drum surface of the cap 78 so that gears 76, 77 are now free to rotate and drive gear 70, shaft 81 and sprocket 53. The film has now been brought into the path shown in FIGURE 5, and it is being advanced through the mechanism in the way that is normal for picture projection and sound reproduction.

When the lever 82 moves downward, the back part of that portion of this lever which carries the brake-shoe 87 comes in contact with the actuating button of a switch 101 (FIGURE 6) and closes this switch. The switch 101 controls the current for the picture projection lamp 100 (FIGURES 4, 5). Thus, the lamp is turned on precisely at the instant when the film begins to run normally through the mechanism, a picture appears on the screen, and this picture can be brought into exact focus by turning the focus knob 110 and, if necessary, framed by turning the framing knob 112 shown in FIGURES 2 and 3. The framing knob 112 acts through a lever 55 shown in FIGURES 4 and 5 to move the intermittent movement mechanism bodily up or down but, since these parts are made in accordance with prior art, they have not been drawn or described in detail. Furthermore, the specific circuitry for energizing the picture projection lamp 100 is fully disclosed in the latter-noted patent application and, through not illustrated, is incorporated herein by reference for clarifying various features of the projector to which this invention is not specifically directed.

Further explanation of the action of the rollers 31 and 36 is now appropriate. In FIGURE 4 it may be seen that lever 37, which carries rollers 31 and 36, is pivoted on the shaft 56. This shaft passes through a boss on the support plate 10 and its other end may be seen in FIGURE 6. The lever 37 has a narrow portion extending below the pivot point which is engaged by the pin 57. Pin 57 is carried by an extension on the lens mount 34, mounted, in turn, upon the upper slide-plate 43. The shaft 56 has attached to it on the end shown in FIGURE 6 a lever 102 to which, in turn, is attached one end of a helical spring 103. The other end of the spring 103 is attached to a pin 104 which is carried by the vertical support plate 10. The spring 103 is stretched so that at all times it pulls on lever 102 and thereby tends to rotate shaft 56 counter-clockwise as viewed in FIGURE 6, and clockwise as viewed in FIGURES 4 and 5. Thus, the force exerted by the spring 103 always tends to move the lever 37, carried by the shaft 56 toward the sprocket 30. Motion of the lever 37 toward the sprocket 30 has the effect of bringing rollers 31 and 36 close to the sprocket 30 so that they are then in position to hold a strip of film in mesh with the teeth of sprocket 30. The lever 37 and the rollers 31 and 36 are shown in the film-retaining relationship to sprocket 30 in FIGURE 5.

When the mechanism is in the condition of readiness to accept the threading of film, or, in other words, when the parts are in the positions in which they are shown in FIGURE 4, the pin 57 engaging the lower end of lever 37 holds lever 37 in a position such that rollers 31 and 36 are far enough away from sprocket 30 to permit easy insertion or removal of film. When the film has been placed in the position shown by the heavy line 22–B in FIGURE 4 and the "Start" button is then depressed so that the loop-forming operation begins and the upper slide-plate 43 moves to the left, as seen in FIGURE 4, the very early part of this movement carries pin 57 out of engagement with lever 37 so that the latter moves clockwise in response to the pull of the spring 103 and idlers 31, 36 approach the sprocket 30. At the same time the sprocket 30 is rotating counter-clockwise so that if the film has been inserted correctly the teeth of the sprocket 30 immediately enter a group of perforations in the film and, as idlers 31 and 36 come close to the sprocket, they are able to come to their proper terminal positions in which they are holding the film close to the cylindrical part of sprocket 30.

If, however, the film has been inserted with the perforations on the wrong edge, either because it was not rewound after a previous showing or because the film reel had been turned incorrectly in placing it on the spindle 21, the tips of the sprocket teeth will support the film at a distance of about ⅟₃₂ inch above the cylindrical surface of the sprocket 30, and the film, in turn, will hold rollers 31 and 36 away from the sprocket 30. Since lever 103 is connected to the rollers through the shaft 56 and the lever 37, the lever 102 is not permitted to reach its maximum counter-clockwise position, as seen in FIGURE 6. The tip of lever 102 will be held in a position approximately ⅟₃₂ inch to the left of the position in which it would have come to rest if the film had been properly inserted. Being in this leftward position, it comes into operative relationship with a safety-grip lever 105 (FIGURE 6) and an action is initiated which very quickly results in the stopping of the motor 60 and the flashing of a warning signal, which may be audible (not shown) or visual, and shown at 11A in FIGURE 1, to inform the operator that he has incorrectly presented the film to the projector.

Lever 105 is mounted by means of a pivot 106 and another lever 107 which, in turn, is mounted on a pivot 108 carried by the vertical support plate 10. A helical spring 109 is attached at its upper end to a pin 113 on the left-hand end of the lever 105. The other end of the spring 109 is attached to a pin 114 held by the vertical support plate 10, so that the spring 109 is always under tension.

A second helical spring 115 is attached at its lower end to a pin which is an extension of the pivot 106 by which lever 105 is mounted on lever 107. The upper end of the spring 115 is attached to a pin 116 carried by the vertical support plate 10. The spring 115 is similarly always under tension.

The pin 113 is an extension of a stud mounted on the lever 105 on the side away from that shown in FIGURE 6. This stud 113–A (FIGURES 4 and 5) projects through a slot 119 in the vertical support plate 10 and carries on the end seen in FIGURES 4 and 5 a roller 118 which is in line with the end of the upper slide 43 so that when the slide 43 is in the position shown in FIGURE 4 the roller 118 is held upward, while when the slide 43 is in the position shown in FIGURE 5, the roller 118 is permitted to move downward. A pin 117 (FIGURE 6) is located near the center of the lever 105 so that it limits the distance to which the spring 115 can move the central part of lever 105 upward. A double-throw, single-pole switch 120 of the snap-action type is secured to the vertical support plate 10 in a location such that its actuating button is opposite the middle of the lever 105. That pair of contacts of switch 120, which are closed when this actuating button is not pressed, is made part of the circuit (not shown but disclosed in the latter-noted application) which supplies power to the motor 60 to cause it to run in the forward direction. That pair of contacts, which are closed when the actuating button is pressed, is connected to a red warning light 11A behind a window in the case 11 of the projector.

Since the construction of the system of parts associated with the lever 105 has been described, it is now possible to describe the action by which the projector stops itself when an attempt is made to cause it to run film that is presented to it improperly, i.e., twisted or non-rewound film whose perforations are not disposed for windable engagement with the teeth (unnumbered) of the sprocket 30.

When the projector is in a state of readiness to receive film, the roller 118 is held in the position shown in FIG. 4 by the end of the upper slide 43. The center of lever 105 rests against the pin 117. These locations of the end and the center, respectively, of lever 105 determine a position of the right-hand end of the lever, as seen in FIGURE 6, such that it is below the radius of the lower end of the lever 102. Since the lever 37 is at the same time held away from the sprocket 30 by the pin 57 (FIGURE 4), the lower end of the lever 102 is in a position to the left of that in which it is shown in FIGURE 6 and is above the right-hand part of the lever 105.

When a strip of film has been placed in the projector in the proper manner as previously described, and if the "Start" button is depressed, the movement of the upper slide 43 which takes place allows the lever 37 to bring the rollers 31 and 36 against the sprocket 30 before the end of the upper slide 43 passes the point of contact between it and the roller 118. The lever 37 and the lever 102 move to their limiting positions, and the lower end of the lever 102 is then beyond the arc on which the tip of lever 105 will move upward. When the further movement of the slide 43 allows the roller 118 and, therefore, the left-hand end of lever 105 to move downward under the pull of the spring 109, the lever 105 rocks around the pin 117, being held against it by the pull of spring 115, and switch 120 is not touched; therefore, the motor 60 continues to run.

If, however, the film is presented improperly, the lever 37 is stopped short of its final position, as previously explained, and correspondingly the lower end of the lever 102 is stopped in a position such that it just catches the right-end of the lever 105 as it moves upward when roller 118 is permitted to move downward. The lower end of the lever 102 is a knife edge and the right-hand end of the lever 105 is provided with a V-shaped notch with which the sharp end (unnumbered) of lever 102 interlocks as is shown in FIGURE 6. The end of lever 102 then becomes a fulcrum on which the lever 105 turns. Since, in this situation, spring 109 has twice as great a lever arm as spring 115, assuming them to be equally strong, spring 109 has control and the whole of lever 105 moves downward away from pin 117 so that the lower side of lever 105 makes contact with the actuating button of switch 120 and pushes it in. This causes switch 120 to break the circuit of the motor 60 and at the same time to close the circuit of the red warning light 11A in theb ase 11 of the projector, as is more fully disclosed in the aforesaid application. This red warning light may also illuminate a printed legend which advises the operator how to correct the threading difficulty or refers him to more complete instructions printed, for example, in the carrying case of the projector.

It should be noted that in order to bring this safety-stop and warning mechanism into action, the upper slide-plate 43 has to move only about one-fourth of the distance that it moves in the complete threading operation so that when film is presented incorrectly the projector stops within one-half second of the time when the attempt is made to start it, and none of the parts has moved far enough to do appreciable damage to the strand of film that is in the mechanism. Since the lever 105 holds the switch 120 in the actuating condition as long as the improperly presented film is at the sprocket 30, attempts by the operator to get the projector to start again by further pressing the "Start" button will have no effect because the main power circuit is interrupted or broken at the switch 120.

Idler roller 38, which, during a normal operation of the projector, holds the film in mesh with the teeth of sprocket 53, is controlled by a pin 125 (FIGURE 5) on the lower slide-plate 44 in a manner analogous to the control of the idlers 31 and 36 by the pin 37. The lever 39 and the idler roller 32 are supported by a shaft 124 which passes through a boss 123 on the vertical support-plate 10, as is shown in FIGURES 4 through 6. The lever 39 is secured to the shaft 124 by a pin or set-screw, while the idler roller 32 rotates on the shaft 124.

On the inner or gear-train side of the vertical support plate 10, the shaft 124 has attached to it by any suitable means, such as a set-screw, a lever 126 (FIGURE 6) which is joined to the lever 102 by a long, narrow steel-band 127. The band 127 fits over a pin 128 in the lever 126 and a pin 129 in the lever 102. The lower end of the band 127 is slotted so that the lever 126 and the shaft 124 can rotate to bring the idler roller 38, mounted on the lever 39, against the sprocket 53 even if the lever 102 is restrained from moving to its terminal position, which would be more counter-clockwise than the position in which the lever 102 is shown in FIGURE 6. If, however, the lever 39 is restrained from moving to its terminal position in which the idler-roller 38 is against the sprocket 53, as shown in FIGURE 5, the lever 102 will be prevented by the tension of the band 127 from moving to its terminal position and, therefore, in such case, the right-hand end of the lever 105 will interlock with the bottom end of the lever 102 in the manner shown in FIGURE 6. This enables the mechanism to sense and respond to the condition that may be brought about by a very careless attempt to insert film into the projector in which the slack of the film is not wound upon the takeup reel with the result that the film is not drawn fully down the inclined surfaces of the guide members 15, 16 and, therefore, has not entered the channels of both the sprocket 30 and the idler roller 32. When the film is handled in this way, three different situations can arise:

(1) The film is not drawn into the slot 14 and, in this case, both idlers 31, 36 and the idler 38 will close against their respective sprockets without interference and the mechanism will go through the motions of threading the film. However, since the film is not inside the projector at all, the completion of the operation will result in a flash of clear line on the screen which will at once make the operator aware of what has happened if he has failed to observe is previously. The film will not, of course, be damaged because it has not been engaged with the mechanism.

(2) The film is drawn partially into the slot 14 but has not reached its proper position, either between the flanges of sprocket 30 or between the flanges of the idler roller 32. In this case, the presence of the film will prevent both idler 31 and idler 38 from reaching their proper terminal positions, whereupon the lever 102 is doubly restrained in approximately the position shown in FIGURE 6, and the lever 105 will operate as previously described to actuate the switch 120 so that the motor 60 will be stopped and the warning light 11A turned on.

(3) It is extremely unlikely that the film will be drawn into the channel between the flanges of the idler 32 without having first seated itself between the flanges of the sprocket 30 because the weight of the vertical strand of film is itself basically sufficient to draw the upper part of the end of film into the channel of the sprocket 30. Therefore, the third case that is of interest is the one in which film has been drawn into this channel in sprocket 30 but has not been drawn into the channel of idler 32. In this case, the film will be caught between the edge of the front cover 12 and the idler roller 38 which will prevent this idler and levers 39 and 126 from reaching their proper terminal positions. Through tension of the bend 127, the lever 102 will, therefore, be held in approximately the position in which it is shown in FIGURE 6 and the switch 120 will be actuated by the lever 105 as before described.

Two important actions which take place while the film loops are being formed will be described immediately hereafter, and attention is first directed to FIGURE 4 which illustrates the upper slide-plate 43 in its initial position with the lever 45 in contact with a post 130 holding the upper end of the lever 45 to the left of a vertical line through the pivot 46. This, in turn, brings the lower end of lever 45 to the right and thus brings the left-hand end of lever 47 and roller 49 to the right of the slot 14 so that they do not interfere with the entry of the film.

A spring 131 has one end bent around a pin 132 carried by the upper slide-plate 43. The spring 131 is coiled once around the pivot 46 in the space below the lever 45 which is far enough above the plate 43 to avoid interference with the offset rack piece 95 (FIGURE 7). The other end of the spring 131 is bent around the rear end of the pin 52 which projects on both the top and the bottom of lever 45. Thus, the spring 131 tends always to bring the lever 45 into a vertical position. A post 133 attached to the upper slide-plate 43 prevents motion of the lever 45 beyond the vertical position, as is shown in FIGURE 5 of the drawings.

The pivot 48, by which the lever 47 is attached to the lever 45, is made loose enough to permit the lever 47 to move downwardly freely under its own weight plus the weight of the roller 49. When the lever 45 is in the position shown in FIGURE 6, however, roller 49 is resting on the top of a guide roller 135 which will be described later in connection with the mechanism for sound reproduction.

Figure 9:
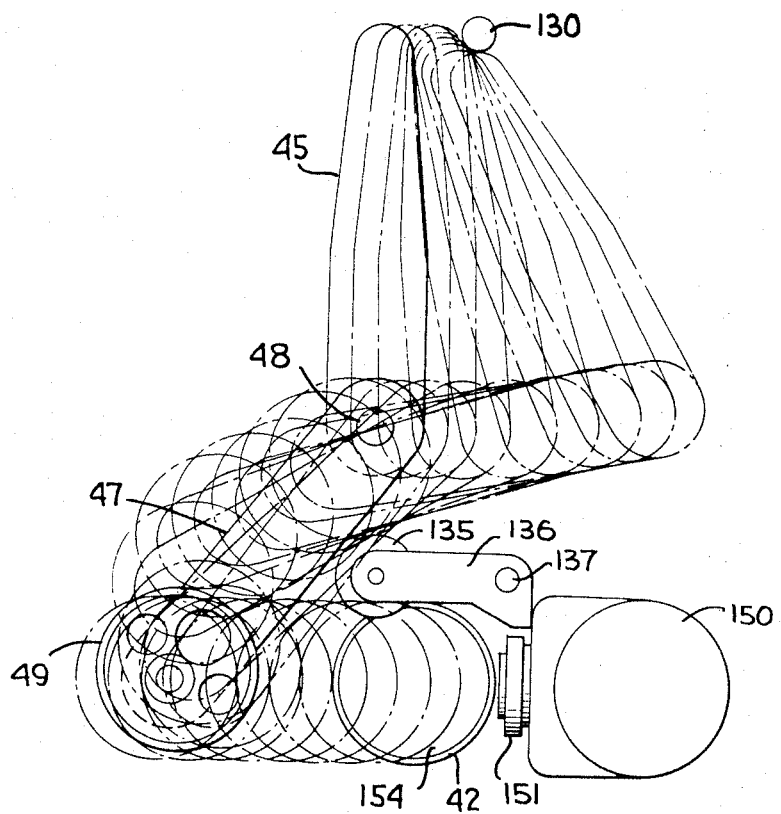
FIGURE 9 is a schematic diagram of the successive positions occupied by the lower loop forming roller and the sound-reproducing drum as the slidable plates, on which they are respectively mounted, are moved during the automatic threading operation.

As the upper slide-plate 43 moves to the left from the position in which it is shown in FIGURE 4 to the position shown in FIGURE 5, levers 45 and 47 and the roller 49 move to the position shown in FIGURE 9. The corresponding positions of the sound-reproducing drum 42 are also shown in FIGURE 9. As the roller 49 moves in the manner shown in FIGURE 9, it progressively displaces the film from the bottom part of the path shown at 22B in FIGURE 4 to that shown at 22C in FIGURE 5, and the sound drum 42 also takes part in this displacement of the film in the manner obviously apparent from FIGURE 9.

A lamphouse 150 contains a suitable small lamp and supports an optical system whose mounting is shown at 151 (FIGURE 5) to provide a scanning light beam focused on the sound-track of the film 22C where it goes around the drum 42. The edge of the film carrying the sound-track overhangs the edge of the drum 42 so that light directed on the sound-track from the optical system mounted in the mounting 151 can pass directly through the film to reach a photo-sensitive cell (not shown) which is mounted on a portion of the drum 42 in turn secured to a stud (unnumbered) on which the drum 42 rotates. When, in the process of moving from the position shown in FIGURE 4 to that shown in FIGURE 5, sound-reproducing drum 42 passes under guide roller 135, it brings the film between the flanges of this roller. The guide roller 135 is carried on a lever 136 which is mounted on a post 137. A spring 139, which is wound for several turns around the part of post 137 which is to the rear of the lever 136 and rests against the side of the lamp house 150, has two actions; it pushes the lever 136 outwardly toward the observer and applies a torque tending to move the left-hand end of the lever 136 and the guide-roller 135 downward. The downward motion is limited by the bottom part of the right-hand end of the lever 135 resting against the body of the lamp house 150. However, when the sound-reproducing drum 42 is under the guide-roller 135, the roller rests on the film on the top of the drum 42 and the right-hand end of the lever 136 does not quite touch the lamp house 150.

When the showing of a film has been completed, or if the user wishes to stop in the middle of a film, the "Stop" button is pressed. This releases the "Start" button by conventional means not shown to open electrical circuits which have been supplying power to the motor 60. When the "Stop" button reaches the bottom of its travel, new circuits are closed causing the motor 60 to run in the reverse direction. At the same time, the right-hand end of a lever 160 (FIGURE 6) is pressed upward by projection 161 attached to the "Stop" button. The upper end of this lever 160 then presses against the bottom part of the lever 82 to override the force exerted by the bow-spring 86 and forces the brake-shoe 87 into contact with the brake-drum surface of the cap 78. The ring-gear 77 is thus held fast so that the power applied to the sun-gear 67 of the differential is again fed out on the shaft 68. Since the motor is running in the reverse direction, a rotation of shaft 68 turns the gears 93, 94 in such directions that the slide-plates 43 and 44 are moved back to their original positions, plate 43 at the right and plate 44 at the left. In the course of this motion, the pin 91 on the lower slide-plate 44 moves the lever 90 back to the position shown in FIGURE 8 which corresponds to the condition that exists in FIGURE 4, and, since lever 85 is connected to lever 90 through the shaft 84, this restores lever 85 on the spring 86 to the positions in which lever 82 is pressed upward and brake-shoe 87 is held against the brake-drum surace 78 even without the action of the lever 160. When the slide-plate 43 reaches nearly its end position in this direction of movement, it lifts the roller 118 and with it the left-hand end of the lever 105. When the roller 118 is in its highest position, the left-hand end of lever 105 makes contact with the actuating button of a switch 121 (FIGURE 5) which opens the power circuit through which the motor 60 is being driven in the reverse direction. The motor coasts to a stop and this additional motion brings the two slide-plates to their original positions in which the pin 57 and the pin 125 have lifted the idlers 31, 36 and 38 away from the sprockets 50 and 53, leaving the space behind the slot 14 entirely open to receive a new strand of film or to permit the removal of the strand that is in the projector if it has been stopped before the film has been completely reproduced.

In order to rewind a reel of film that has been projected, the end of the film from the take-up reel on the spindle 24 is brought up over the idler-roller 165, as shown in FIGURES 2 through 5, and this film end is attached to the reel from which it was previously unwound, this reel remaining on the feed-spindle 21. The "Rewind" button is depressed which releases the "Stop" button and, at the same time, a lever 171 (FIGURE 6) pushes upwardly on a lever 170 which, in turn, is linked to a long, metal strip 172 and communicates the motion to still another lever 173 at the top of the mechanism. The lever 173 carries a rubber or soft plastic friction wheel 174 which, by the downward pull communicated to lever 173, is brought into a position where it is in contact with both a drum 175 and a drum 177, the latter being mounted on the gear 70. Drum 175 is mounted on a shaft 178 which passes through a bearing in plate 10 and communicates with a train of gears contained in a known manner within feed-reel arm 17 to rotate the spindle 21 counter-clockwise, as viewed in FIGURE 2, when the drum 175 is rotated. The motor 60 rotates in an appropriate direction and, by the action of the main gear train previously described, this rotation rotates gear 70 and the drum 177. The rubber friction wheel 174 transmits this motion to the drum 175 and, therefore, the feed-reel on the spindle 21 is rotated counter-clockwise at a comparatively high speed until the film has been rewound on it. While this is being done, the mechanism involving the differential and the two slide-plates 43 and 44 go through the same motions as if a strand of film were being threaded for projection, although, of course, there is no film within the projector. This does no harm and, when the rewinding process is finished, the operator again depresses the "Stop" button. This releases the "Rewind button" and a spring 176 connected with the lever 173 pulls the friction wheel 174 out of contact with the drum 177, and, through the linkages shown in FIGURE 6, restores parts 172, 170 to their original positions.

When the projector is running and projecting film, it is, of course, necessary to drive the spindle 24 so as to take up the film as it emerges from the mechanism. The drive for this purpose is obtained from a pulley 180 mounted on the gear 80 (FIGURE 6). A belt 181 links the pulley 180 to another 182 mounted on a shaft 183. The shaft 183 passes through the vertical support plate 10 and communicates its motion in a known manner through a train of gears and a slip clutch contained in the take-up reel arm 18 to the spindle 24 on which the take-up reel is mounted.

From the foregoing, it will be seen that novel advantageous provisions have been made for carrying out the desired end. However, attention is directed to the fact that additional variations may be made in this invention without departing from the spirit and scope thereof as defined in the appended claims.

I claim:

1. A motion picture projector comprising first feed means for feeding film into projections means, second feed means for feeding film out of the projection means, means for initially actuating one of said feed means without actuating the other of said feed means whereby a portion of the film is disposed in the vicinity of the projection means, and means for actuating the other of said feed means after the film has been so disposed whereby the film is thereafter advanced through the projection means by both of said feed means.

2. The motion picture projector as defined in claim 1 including means for displacing the film from a first path to a second path during the actuation of said one feed means.

3. The motion picture projector as defined in claim 1 wherein said first and second feed means are rotatable sprockets.

4. The motion picture projector as defined in claim 1 including means for displacing the film from a first path to a second path during the actuation of said one feed means, and said first and second feed means are rotatable sprockets.

5. The motion picture projector as defined in claim 1 including means for displacing the film from a first path to a second path during the actuation of said one feed means, and selective coupling means between the first and second actuating means and the displacing means for effecting substantially simultaneous operation of said first feed means and said displacing means, and deactivation of said displacing means substantially simultaneously with the actuation of said second feed means.

6. The motion picture projector as defined in claim 1 including means for displacing the film from a first path to a second path during the actuation of said one feed means, said displacing means including first and second members normally positioned at opposite sides of said first path, and means for moving said first and second members from the normal positions thereof to second positions generally on opposite sides of the first path as compared to the normal positions thereof thereby forming said second film path.

7. The motion picture projector as defined in claim 1 including means for displacing the film from a first path to a second path during the actuation of said one feed means, said displacing means including first and second members normally positioned at opposite sides of said first path, one of said members including sound reproducing means, means cooperative with said sound reproducing means being normally positioned to a side of said first path opposite said sound reproducing means, and means for moving said first and second members from the normal positions thereof to second positions generally on opposite sides of the first path as compared to the normal positions thereof with said sound reproducing means being contiguous to said cooperative means thereby forming said second film path.

8. A motion picture projector comprising first sprocket means for feeding film into projection means, second sprocket means for feeding film out of the projection means, drive means for selectively rotating said first and second sprocket means, means for temporarily preventing the rotation of said second sprocket means during the initial rotation of said first sprocket means incident to the threading of film to and through the projection means whereby a portion of the film is disposed in the vicinity of the projection means, and means for simultaneously rotating said first and second sprocket means in unison after a time period during which only said first sprocket means is rotated.

9. The motion picture projector as defined in claim 8 wherein said last-mentioned rotating means include first and second output means coupled between the respective first and second sprocket means and said drive means, and said rotation preventing means is defined by brake means normally preventing rotation of said second sprocket means.

10. The motion picture projector as defined in claim 8 including means for displacing film from a first path to a second path during the rotation of said first sprocket means, and means coupled between said displacing means and said rotation preventing means for deactuating the latter means whereby the film is advanced along said second path by the rotation of both said first and second sprocket means.

11. The motion picture projector as defined in claim 8 including means for displacing film from a first path to a second path during the rotation of said first sprocket means, and displacing means being defined at least in part by sound reproducing means normally positioned to one side of said first path but moveable to a second side thereof, and means selectively coupling said sound reproducing means to said drive means for substantially simultaneously rotating said first sprocket means and moving said sound reproducing means to the second side of the first path prior to the rotation of said second sprocket means.

12. A motion picture projector comprising first sprocket means for feeding film into projection means, second sprocket means for feeding film out of the projection means, first and second gear means coupled to the respective first and second sprocket means, drive means for driving the first and second gear means, brake means for temporarily preventing the rotation of said second gear means and second sprocket means during the initial rotation of said first sprocket means incident to the threading of the film to and through the projection means whereby a portion of the film is disposed in the vicinity of the projection means, and means for deactivating said brake means after a time period during which only said first sprocket means is rotated whereby thereafter said first and second gear means drive said first and second sprocket means for actuating said deactivating means.

13. The motion picture projector as defined in claim 12 wherein said second gear means in part define a planetary gear mechanism.

14. The motion picture projector as defined in claim 12 including means for displacing the films from a first path to a second path during the actuation of said first sprocket means, said displacing means including a pair of rack means, gear means in mesh with said rack means for moving said rack means in opposite directions upon the rotation of said last-mentioned gear means, and said last-mentioned gear means being driven by one of said first and second gear means.

15. The motion picture projector as defined in claim 12 wherein said second gear means is a planetary gear mechanism, said planetary gear mechanism being defined by a sun gear, planetary gears, a first gear in mesh with the planetary gears, and a second external gear, said drive means being coupled to said sun gear, said external gear being coupled to said second sprocket means, and said brake means being effective to prevent the rotation of said external gear until deactivated by said deactivating means.

16. The motion picture projector as defined in claim 12 wherein said second gear means is a planetary gear mechanism, said planetary gear mechanism being defined by a sun gear, planetary gears, a first gear in mesh with the planeary gears, and a second external gear, means for displacing the film from a first path to a second path during the rotation of said first sprocket means, means coupling said displacing means to said sun gear, and means coupling said external gear to said second sprocket means.

17. The motion picture projector as defined in claim 12 including means mounting said brake means and brake deactivating means for relative pivoting movement between over and under center positions, and biasing means coupled between said brake means and brake deactivating means for rapidly deactivating said brake means upon relative movement of said brake means and brake deactivating means between the over and under center position thereof.

18. The motion picture projector as defined in claim 17 wherein said brake means and brake deactivating means include levers having generally common pivots, a portion projecting medially from said brake means lever, and said biasing means being coupled between said portion and an end portion of said brake deactivating lever.

19. The motion picture projector as defined in claim 17 including means for displacing film from a first path to a scond path during the actuation of said first sprocket means, said film displacing means including a pair of slidable rack means, and said pair of rack means include means for actuating said deactivating means.

20. The motion picture projector as defined in claim 17 including means for displacing film from a first path to a second path during the actuation of said first sprocket means, said film displacing means including slidable rack means, loop-forming means pivotally carried by said rack means, said rack means being movable between two terminal positions, and said rack means including means for actuating said deactivating means during movement of said rack means between said positions.

21. The motion picture projector as defined in claim 19 wherein said last-mentioned actuating means includes pin means carried by one of said rack means, and said pin means is mounted in alignment with a member coupled to said brake deactivating lever pivotal movement of said last-mentioned member during the movement of said one rack causes the brake deactivating lever to pivot to a position at which said biasing means cause deactivation of said brake means.

References Cited

UNITED STATES PATENTS

| 3,201,796 | 8/1965 | Michaels | 226—91 X |
| 3,351,254 | 11/1967 | Lustig et al. | 226—91 |

ALLEN N. KNOWLES, *Primary Examiner.*

U.S. Cl. X.R.

226—113; 352—158, 159